United States Patent [19]
Westerling

[11] 3,765,546
[45] Oct. 16, 1973

[54] APPARATUS FOR STACKING OR UNSTACKING CONTAINERS

[76] Inventor: David E. Westerling, 5936 Meadowbrook Ln., Riverside, Calif.

[22] Filed: Oct. 6, 1971

[21] Appl. No.: 187,042

[52] U.S. Cl. .............................. 214/6 BA, 214/8.5 K
[51] Int. Cl. ............................................. B65g 57/30
[58] Field of Search ...................... 214/6 BA, 8.5 K, 214/6 P, 8.5 A, 8.5 R

[56] References Cited
UNITED STATES PATENTS

| | | | |
|---|---|---|---|
| 3,466,839 | 9/1969 | Temple............................. | 214/6 BA |
| 3,325,021 | 6/1967 | Burns et al. ...................... | 214/6 BA |
| 3,421,638 | 1/1969 | Locke et al. ..................... | 214/6 BA |
| 3,478,897 | 11/1969 | Dykeman ........................ | 214/6 BA |
| 3,039,625 | 6/1962 | Bruce .............................. | 214/6 BA |

FOREIGN PATENTS OR APPLICATIONS

| | | | |
|---|---|---|---|
| 209,770 | 8/1957 | Australia......................... | 214/8.5 K |
| 1,061,861 | 3/1967 | Great Britain.................... | 214/6 BA |
| 1,415,732 | 9/1965 | France.............................. | 214/6 BA |

*Primary Examiner*—Robert J. Spar
*Attorney*—F. W. Anderson et al.

[57] ABSTRACT

An apparatus which can be converted to either a stacker or an unstacker of relatively heavy objects, such as bins of fruit, that are delivered to and from the apparatus by means of a conveyor. The bins are supported upon dogs which are pivotally mounted upon a pair of carriages positioned at each side of the conveyor. The carriages are slidably mounted upon upright posts and are arranged for joint switch-controlled vertical movement on the posts. This joint movement is provided by vertically extending racks which are attached to the carriages and which are arranged to be driven through pinions affixed to a common horizontal shaft at the top of the apparatus.

10 Claims, 30 Drawing Figures

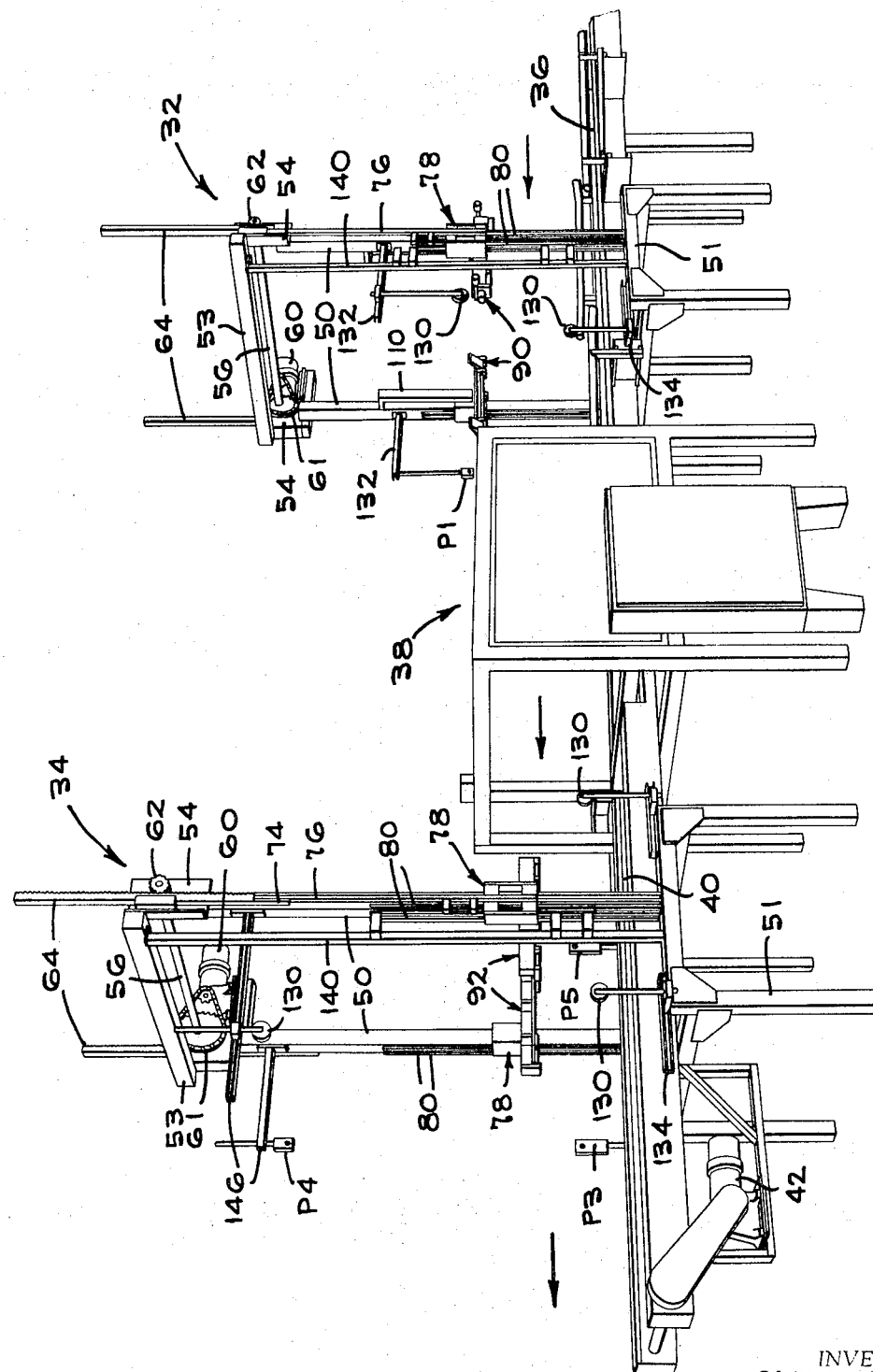

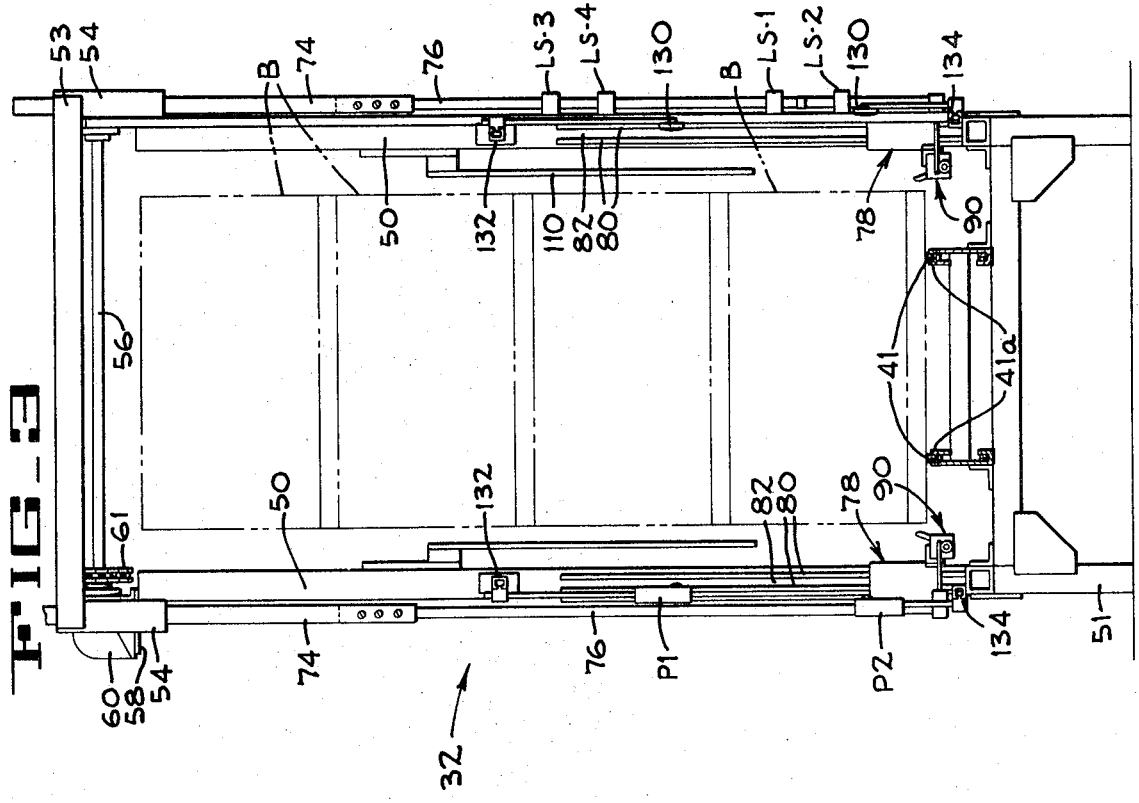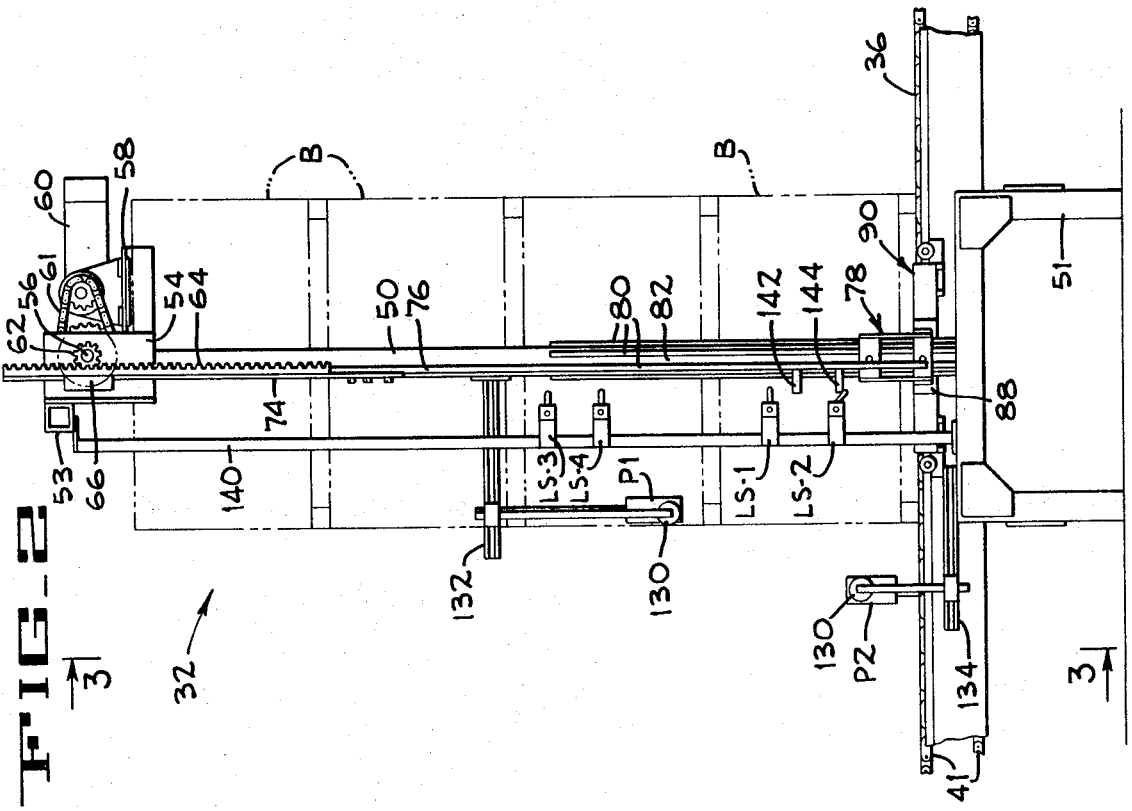

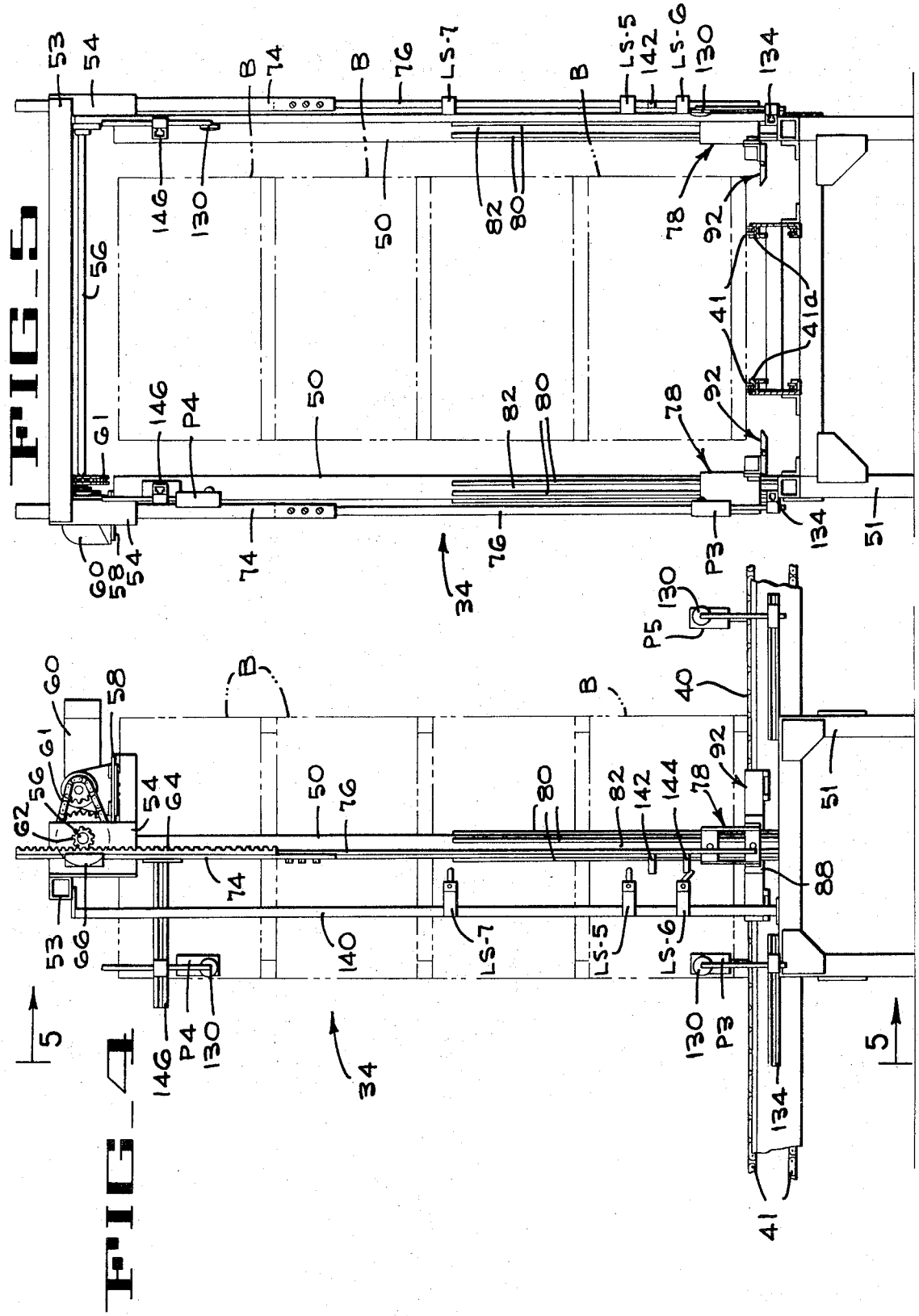

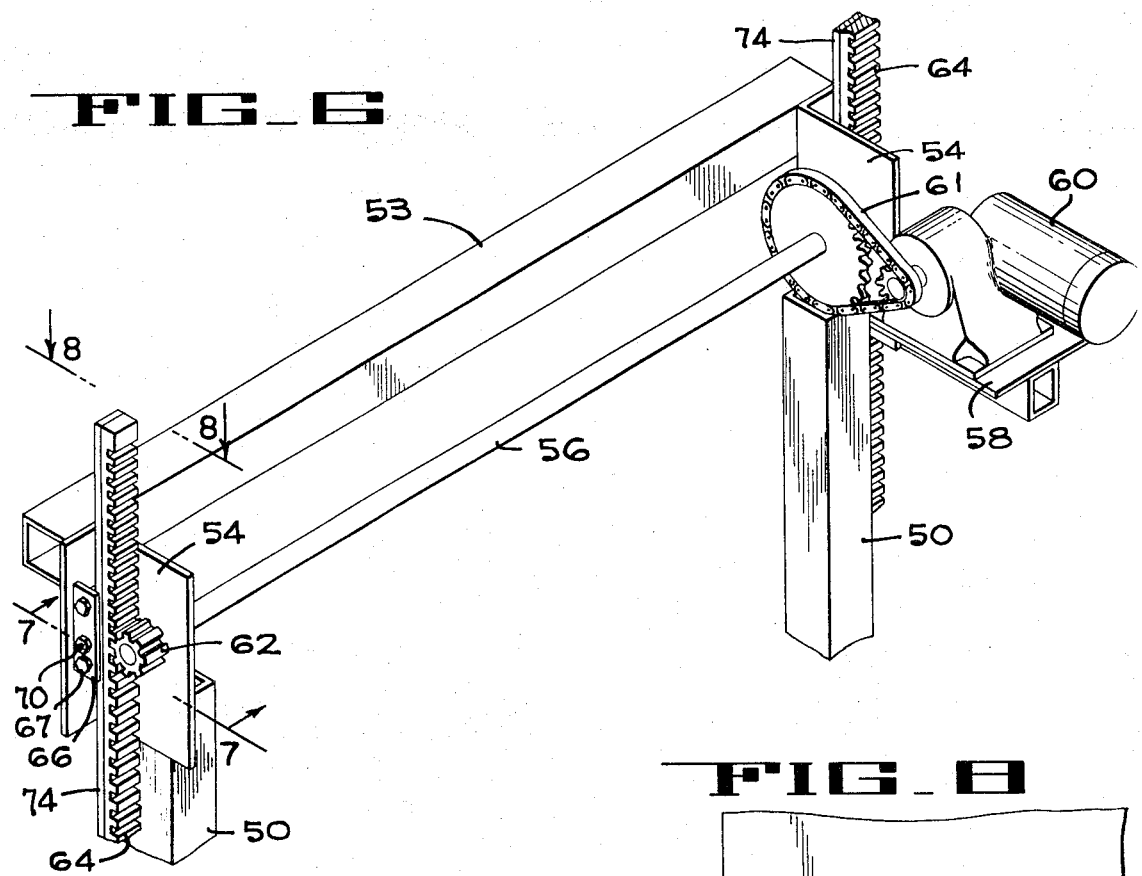
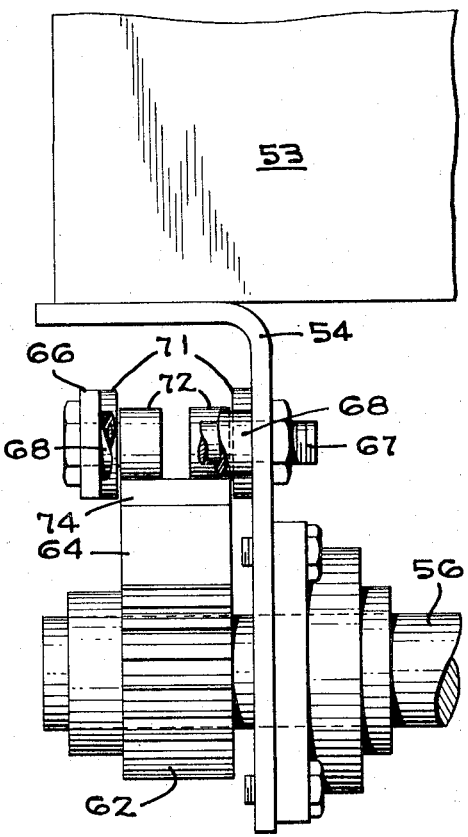
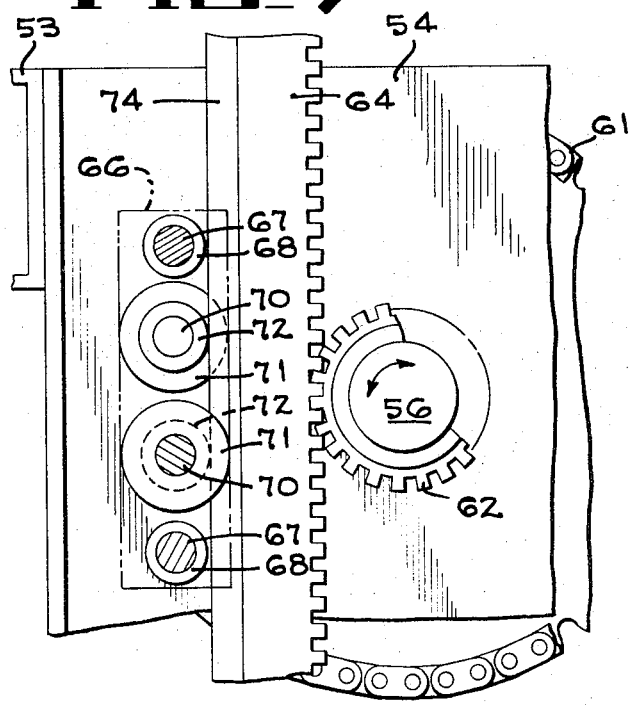

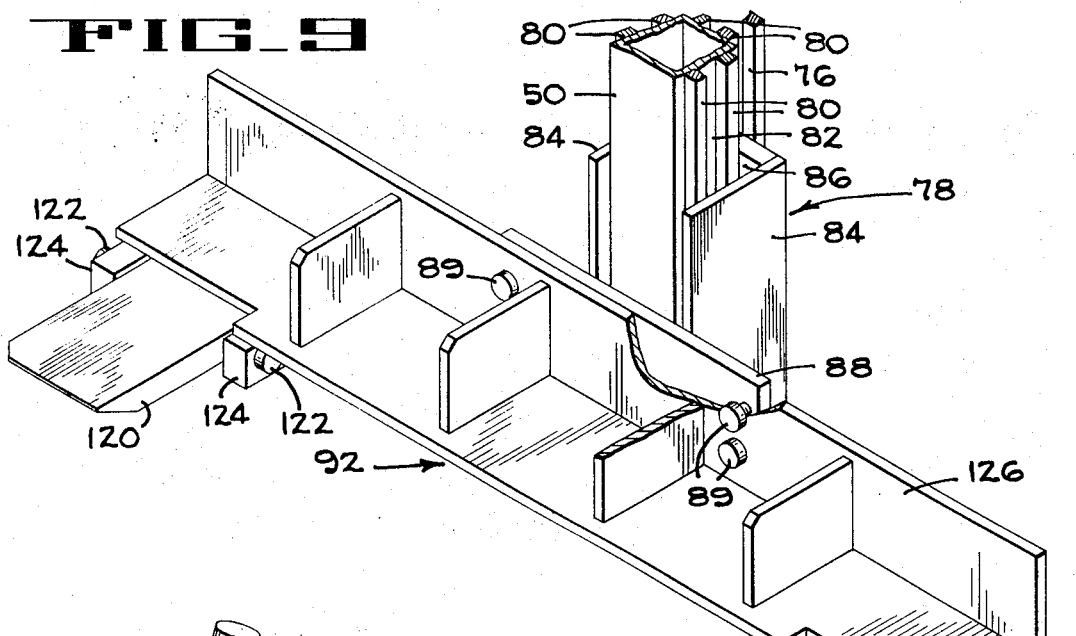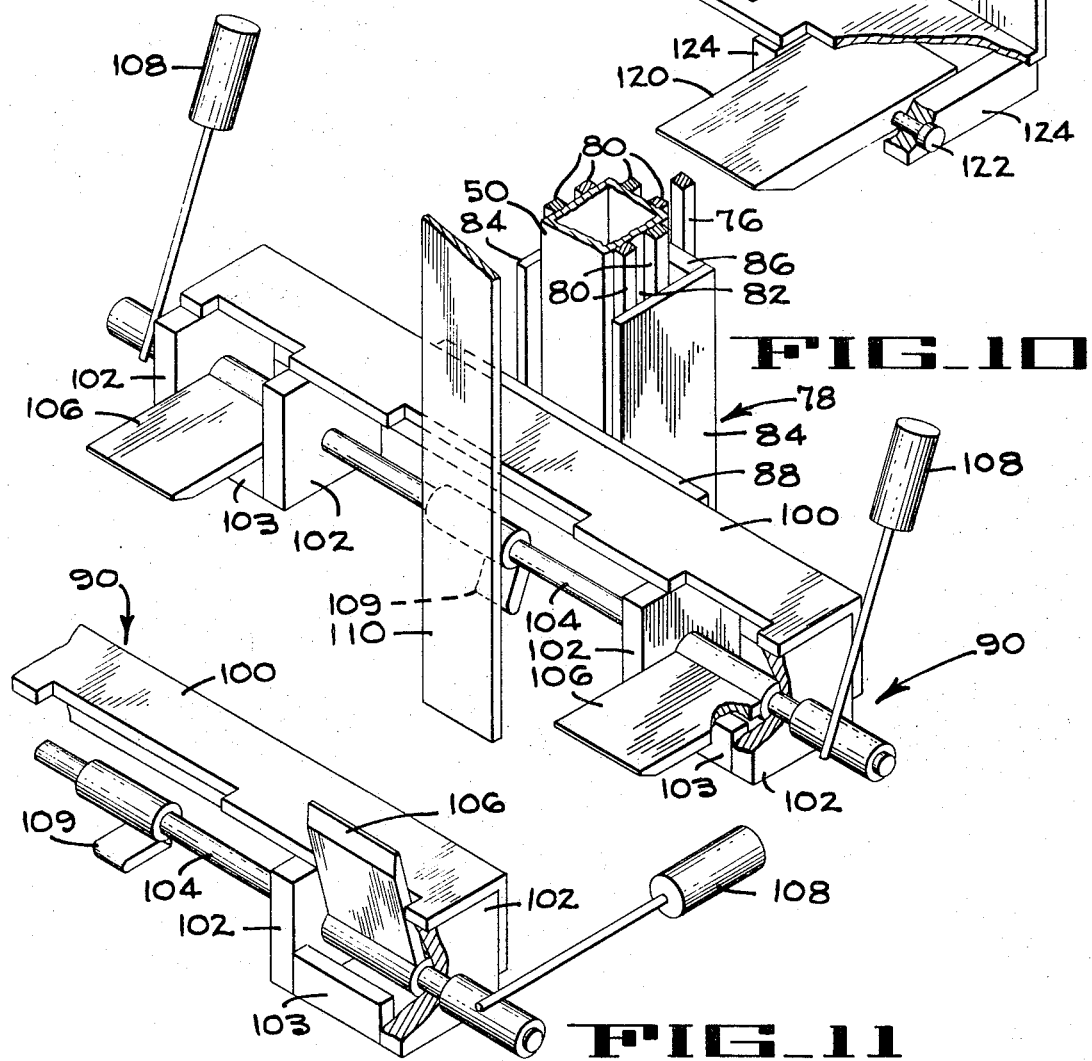

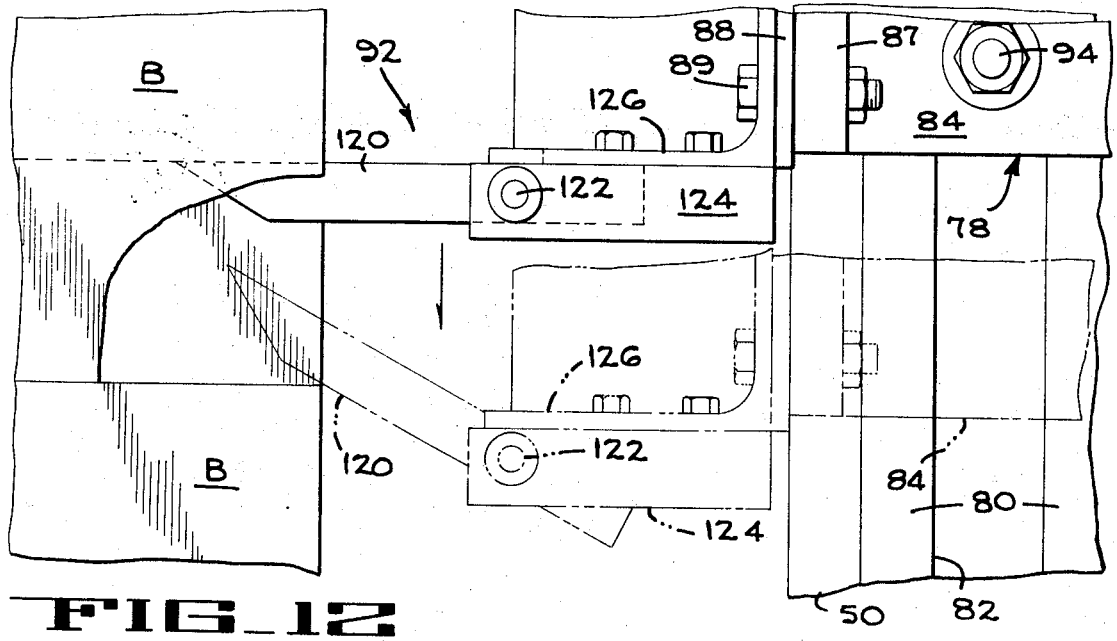
FIG_12
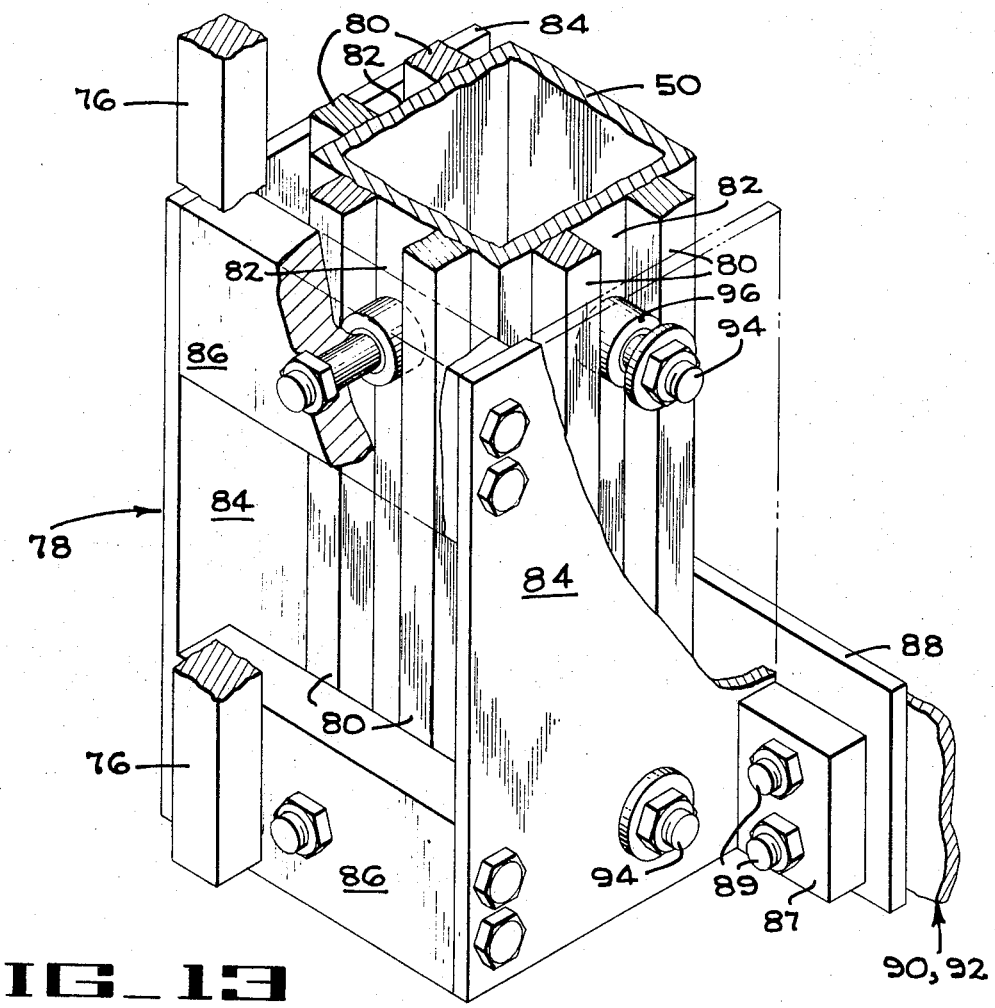
FIG_13

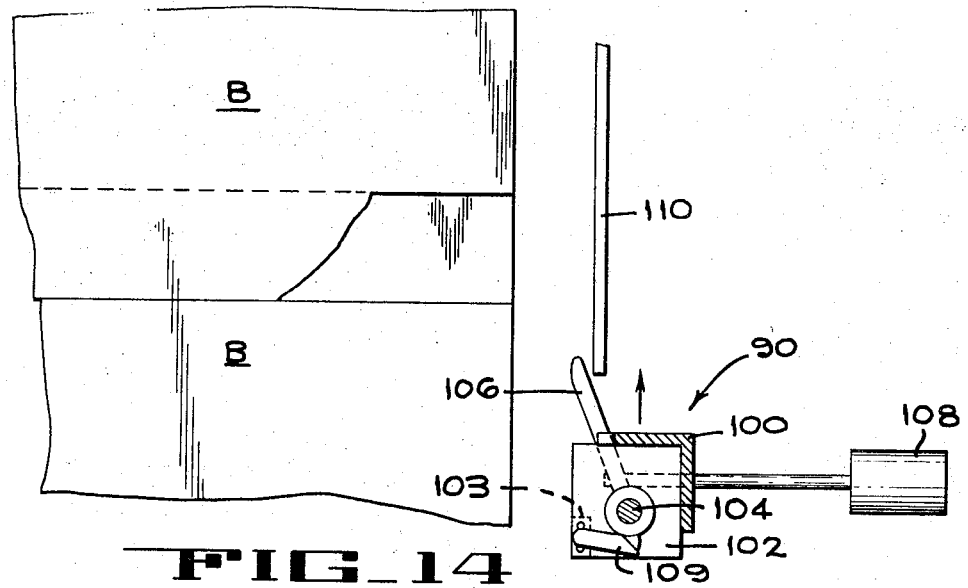
FIG_14
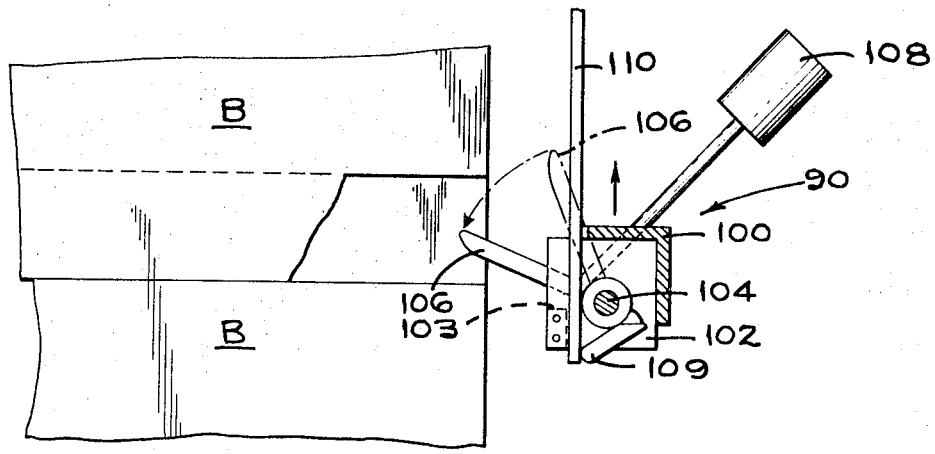
FIG_15
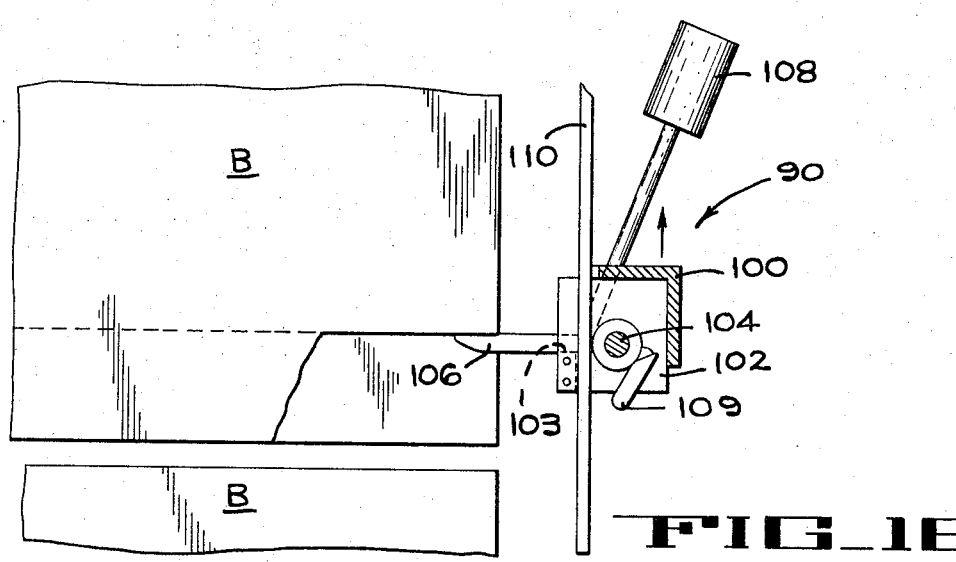
FIG_16

FIG_17
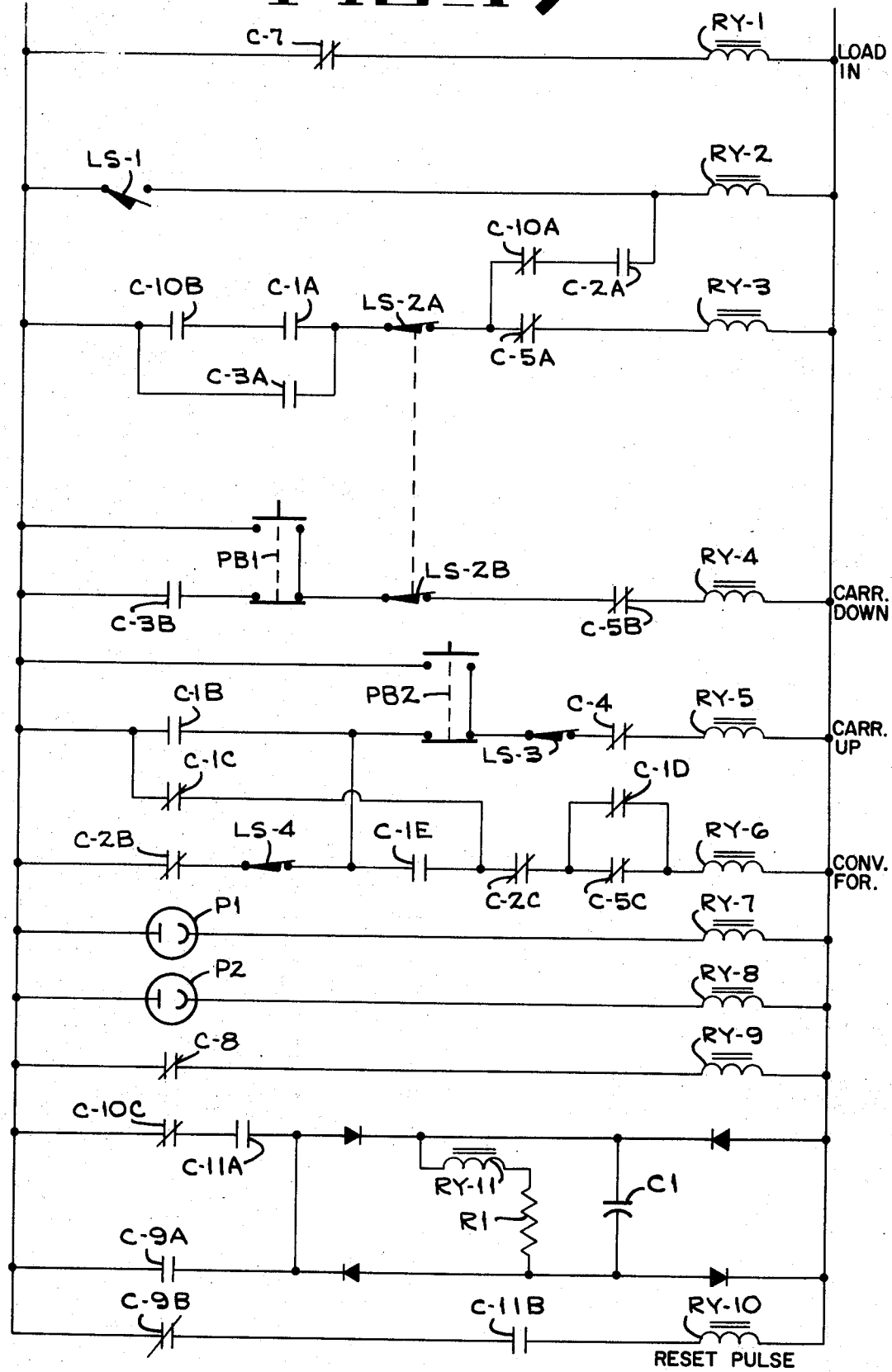

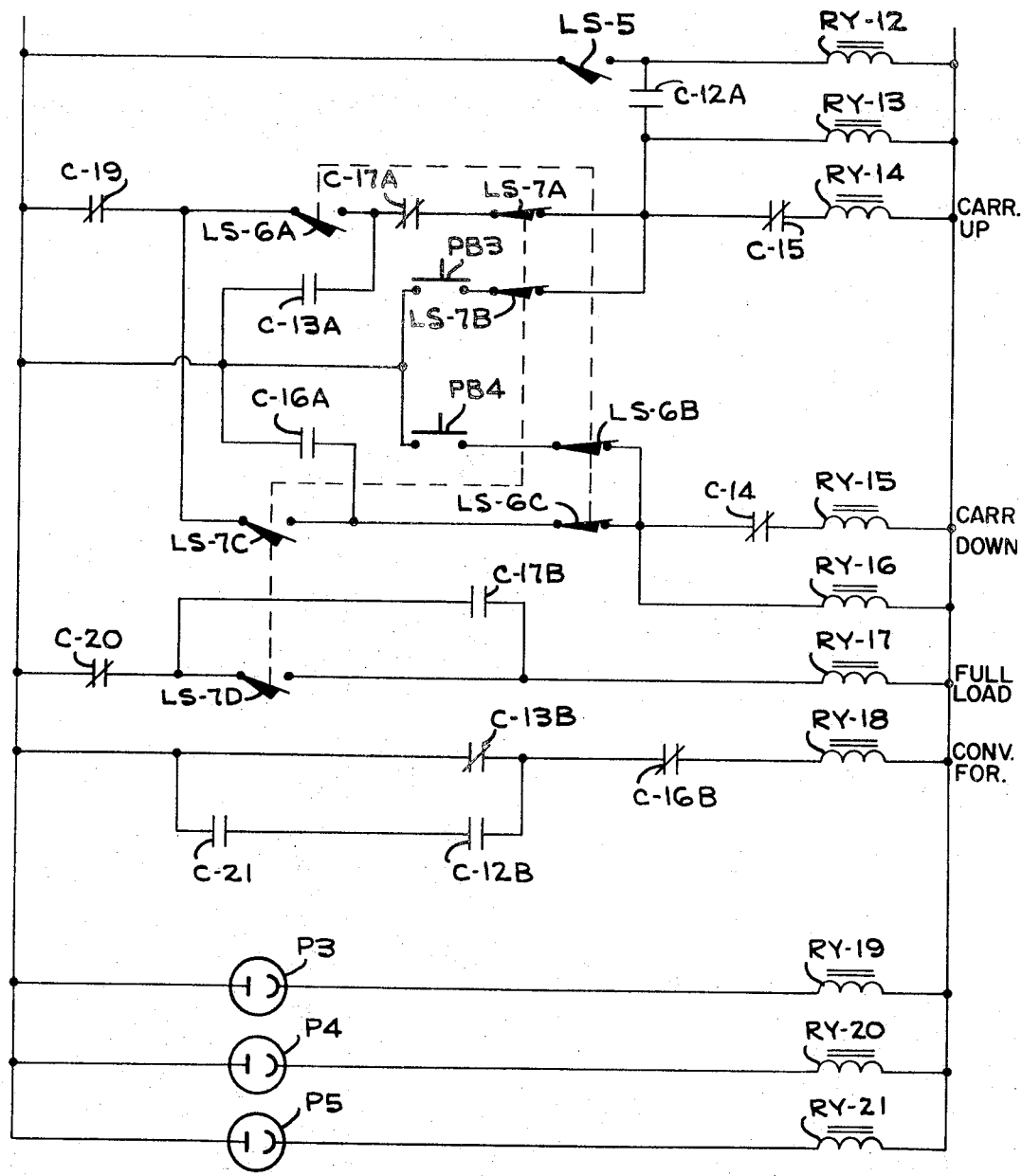
FIG_18

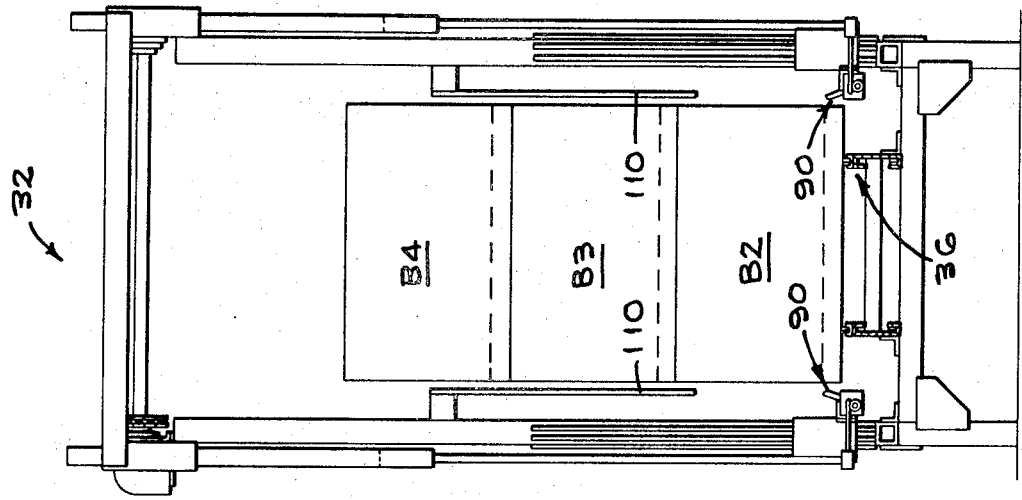
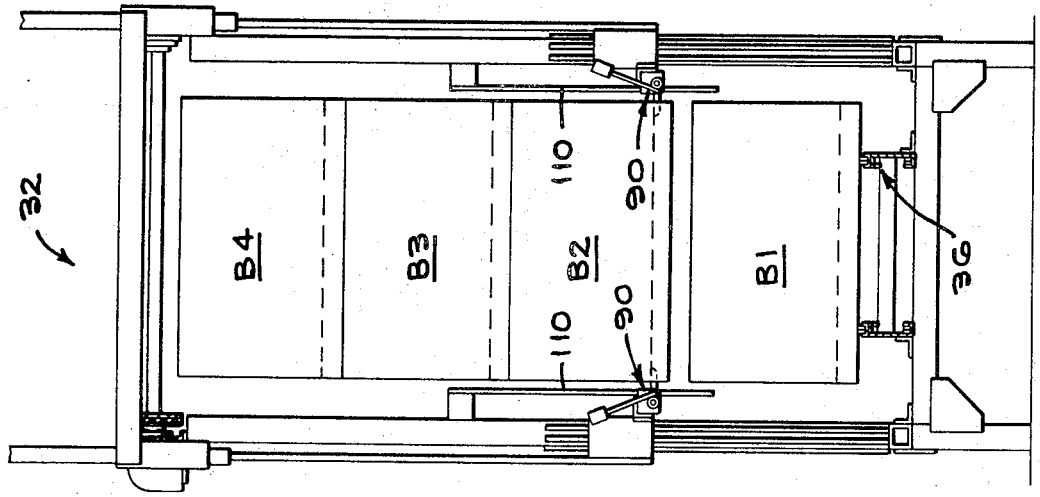
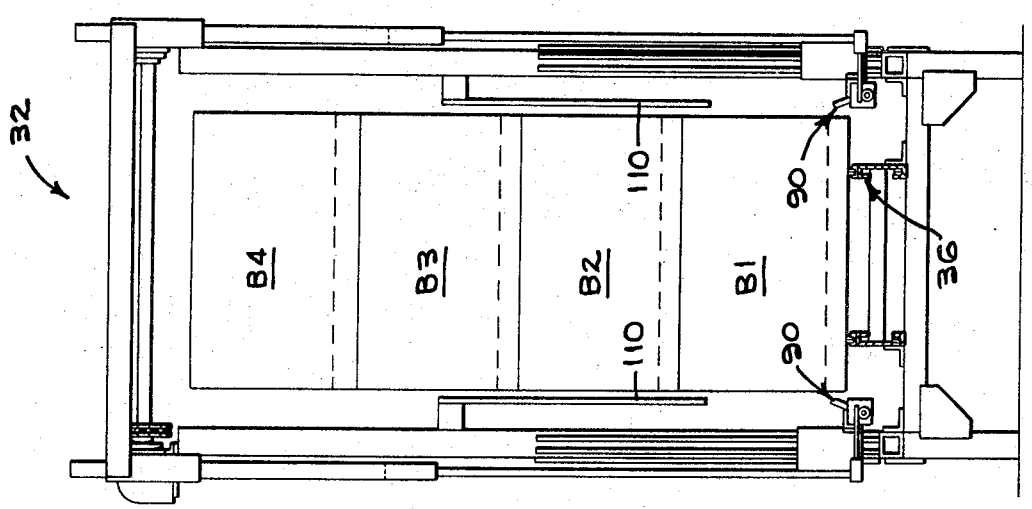

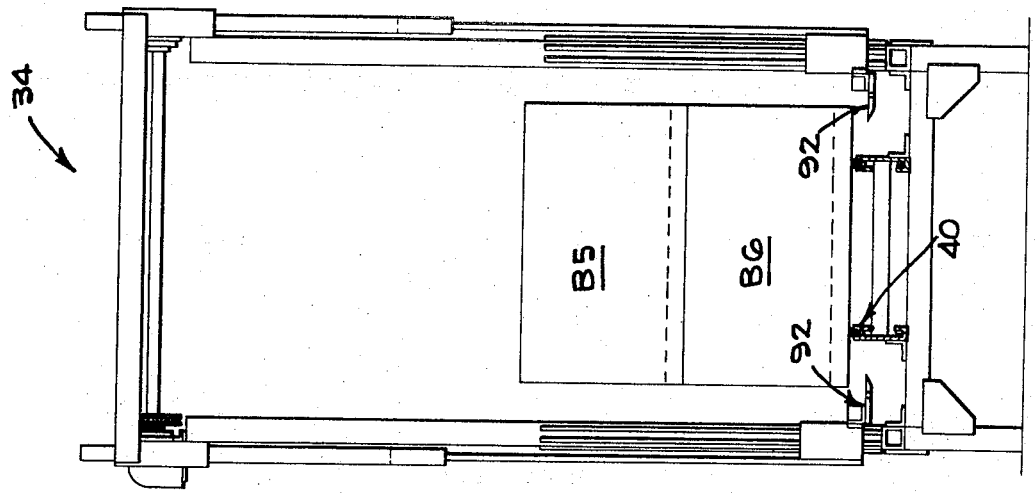
FIG_27
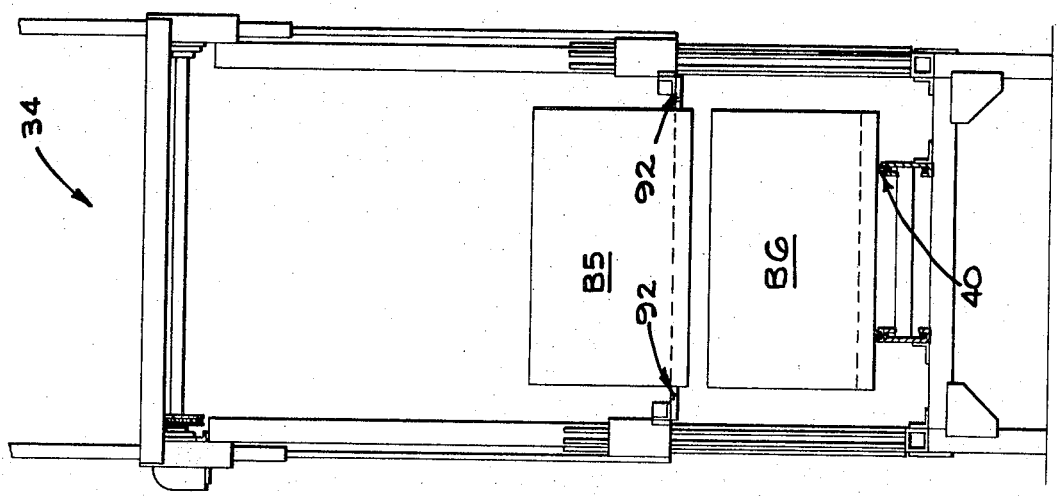
FIG_26
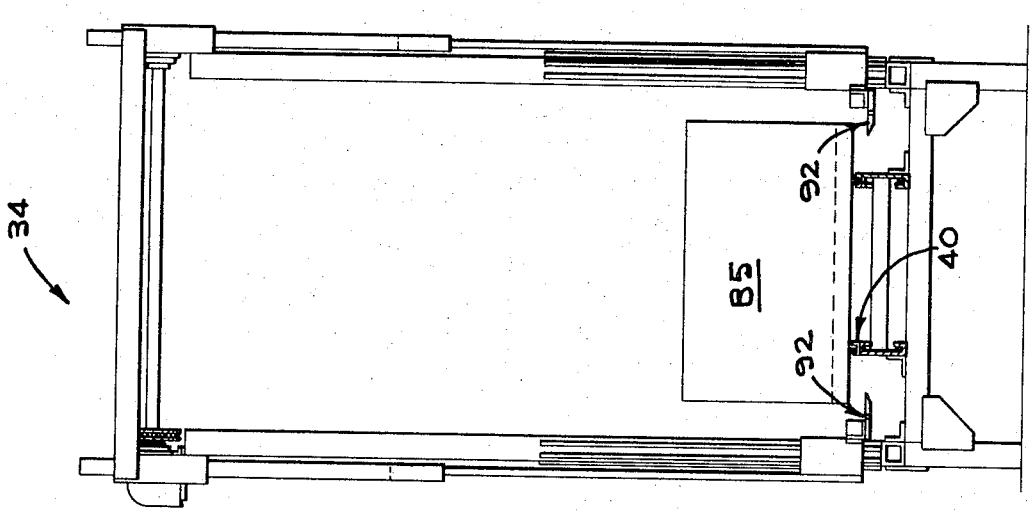
FIG_25

APPARATUS FOR STACKING OR UNSTACKING CONTAINERS

BACKGROUND OF THE INVENTION

1. Field of the Invention

In general, the present invention pertains to that field of art concerned with apparatus for stacking or unstacking articles, and more particularly, it pertains to apparatus for stacking or unstacking relatively heavy articles, such as bulk fruit bins, which are conveyed to and from the apparatus by means of a horizontally arranged conveyor.

2. Description of the Prior Art

Apparatus for automatically stacking or unstacking relatively heavy objects have been used in many industries for a long period of time because of the obvious need for mechanization in the handling of such loads. For example, in the fruit packing industry fruit is normally brought into the packing house in large 25 bushel bins each of which may carry a load of three-quarters of a ton or more of fruit. In order to facilitate the storage of these bins and to reduce the overall handling costs, the bins are normally stacked three or four high. When certain operations prior to stacking, such as washing or pre-grading, are to be performed upon the fruit, the bin stacks must be broken down and then reformed. In the past many different types of case or container stacking mechanisms have been used to perform these functions, but none have proven to be entirely acceptable to the fruit packing industry primarily because of lack of durability and ruggedness, excessive maintenance requirements, or unusually high initial costs due to bulky and/or complex structure.

The conventional container stacking or unstacking apparatus is provided with opposed pairs of pivotable dogs which are positioned upon carriages mounted for vertical movement. The carriages are arranged at opposite sides of the fruit containers so that the containers can be lifted and lowered both individually or in groups, and a transport conveyor is provided for jointly controlled operation with the stacking or unstacking apparatus to bring the containers into and out of their stacking or de-stacking positions. By programming the vertical movement of the dogs and providing sensing means for detecting the position of the containers, the aforedescribed apparatus can be used to either stack or unstack containers or, in some instances, to do both.

One of the typical means by which the aforedescribed dogs are powered to lift or lower the containers is by the use of hydraulic or pneumatic cylinders which may be arranged at one or both sides of the transport conveyor to directly control the movement of the lifting carriages. Such apparatus is shown, for example, in the prior U.S. Pats. to Vann et al. No. 2,885,111, Hallenius No. 2,931,524, Russell et al. No. 3,053,402, or Schmid No. 3,086,665.

Another common manner in which the container lifting dogs are mounted for vertical movement is by means of endless chains arranged at the opposed sides of the stacking or unstacking apparatus. Such a method is utilized, for example, in the apparatus disclosed in the prior U.S. Pats. to Huisking No. 2,897,949, Russell No. 2,948,382, or Burns et al. No. 3,325,021.

Other methods of lifting and lowering the container supporting dogs include the use of vertically extending arms positioned at opposed sides of the stacking or unstacking apparatus which are driven through a crank mechanism as shown, for example, in the prior U.S. Pat. to Adams No. 2,769,570. Also, fruit boxes have been stacked by means of a pair of vertically extending screws arranged at opposed sides of the apparatus which screws are threadedly connected with the lifting dogs as shown, for example, in the prior U.S. Pat. to Daves et al. No. 2,609,111.

While the aforementioned devices have generally performed their intended stacking or unstacking functions in an acceptable manner, it will be noted that the devices generally include structure which is relatively complex or bulky and, therefore, expensive to manufacture. In the fruit packing industry, where handling costs must be kept to a minimum, there has for many years been a need for a relatively simple and inexpensive stacking and unstacking apparatus which will be rugged enough to handle the relatively heavy loads imposed by bulk bins but which will not involve complex or otherwise expensive components.

Another problem, which is prevalent with most of the aforementioned stacking or unstacking apparatus, is the fact that a great deal of maintenance is necessitated when the mechanisms for performing the stacking and unstacking operations are complex or are subject to mechanical failure. For example, the various hydraulic and pneumatic circuitry involved in the elevator mechanisms for the stackers and unstackers are frequently subject to breakdown. Also, the endless chain mechanisms and similar devices are frequently subject to damage due to misaligned loads. In the fruit packing industry particularly where a perishable product is involved, the delays accompanying a breakdown in the container handling equipment often prove to be intolerable.

SUMMARY OF THE INVENTION

With the apparatus of the present invention a device is provided which can be converted either to a stacker or an unstacker merely by shifting the position of the various sensing mechanisms and by altering slightly the structure of the container supporting dogs or fingers. Unlike the apparatus of the prior art, the stacking apparatus of the present invention is relatively simple and of light weight construction and does not include any complex or bulky components. The apparatus is relatively inexpensive to manufacture and operate even though it is designed to handle particularly heavy loads such as the large bulk fruit bins used in the fruit packing industry.

The apparatus of the present invention is designed to operate in combination with a horizontally oriented conveyor which both brings the containers to be stacked or de-stacked into the apparatus and discharges them therefrom. In the case wherein the apparatus of the present invention comprises an unstacker, the conveyor individually removes the lowermost container from a stack of containers while the upper bins are elevated and held by the vertically movable container support fingers. In the case wherein the apparatus of the present invention comprises a stacker, the conveyor delivers individual containers to the apparatus while the vertically movable container support fingers elevate and retain those containers previously delivered until they can be deposited atop the lowermost container.

Basically, the apparatus of the present invention comprises a pair of upright posts arranged at opposed sides of the container transport conveyor. Carriages are mounted for vertical travel on the posts and are arranged to carry the pivotable fingers which are positioned so as to be received under the containers for lifting or lowering them. Each carriage is connected to a vertically extending rack. A motor is drivingly connected to a shaft which is provided with a pair of pinions engaged with the vertically extending racks. Consequently, when the motor is driven, the racks are moved upwardly or downwardly to, in turn, move the container or containers upwardly or downwardly in the desired manner.

With the rack and pinion drive of the present invention the stacker-unstacker apparatus is provided with strength and ruggedness and yet with a minimum amount of structure and a minimum amount of complexity so that servicing problems are virtually eliminated.

BRIEF DESCRIPTION OF THE DRAWINGS

FIG. 1 is a perspective view of a bin stacker and a bin unstacker constructed in accordance with the teachings of the present invention and arranged in a bin handling line which includes a bin dumping mechanism positioned between the two devices.

FIG. 2 is a side elevation of the unstacker shown in FIG. 1.

FIG. 3 is an end elevation of the unstacker of FIG. 2 taken in the direction of the arrows 3—3.

FIG. 4 is a side elevation of the stacker shown in FIG. 1.

FIG. 5 is an end elevation of the stacker shown in FIG. 4 taken in the direction of the arrows 5—5.

FIG. 6 is an isometric view of the upper portion of the stacker or unstacker particularly illustrating the rack and pinion drive means for the apparatus of the present invention.

FIG. 7 is an enlarged vertical section taken along the line 7—7 of FIG. 6.

FIG. 8 is an enlarged plan taken in the direction of the arrows 8—8 of FIG. 6.

FIG. 9 is an isometric view illustrating one of the lift mechanisms used in the stacker as shown in FIGS. 4 and 5.

FIG. 10 is an isometric view illustrating one of the lift mechanisms used in the unstacker as shown in FIGS. 2 and 3 with the container support fingers being shown in their lowered or lifting position.

FIG. 11 is an isometric view of a portion of one of the lift mechanisms for the unstacker similar to FIG. 10 but showing one of the fingers in its elevated or inoperative position.

FIG. 12 is an enlarged side elevation of the lift mechanism for the stacker particularly illustrating, by means of phantom lines, the manner in which the support fingers are pivoted to permit the mechanism to be moved downwardly past an underlying container.

FIG. 13 is an enlarged isometric view of one of the carriages and its manner of mounting upon the vertical support post.

FIGS. 14, 15 and 16 are diagrammatic side elevation views illustrating the operation of the support fingers for the unstacker including, particularly, the manner in which the fingers are cammed inwardly between the stacked containers to lift the upper containers from the lowermost container.

FIG. 17 is a schematic representation of the electrical circuitry for the unstacker of FIGS. 2 and 3.

FIG. 18 is a schematic representation of the electrical circuitry for the stacker of FIGS. 4 and 5.

FIGS. 19–24 are diagrammatic end elevation views of the unstacker of FIGS. 2 and 3 illustrating the operation thereof.

FIGS. 25–30 are diagrammatic end elevation views of the stacker of FIGS. 4 and 5 illustrating the operation thereof.

DESCRIPTION OF THE PREFERRED EMBODIMENTS

Figure 24:
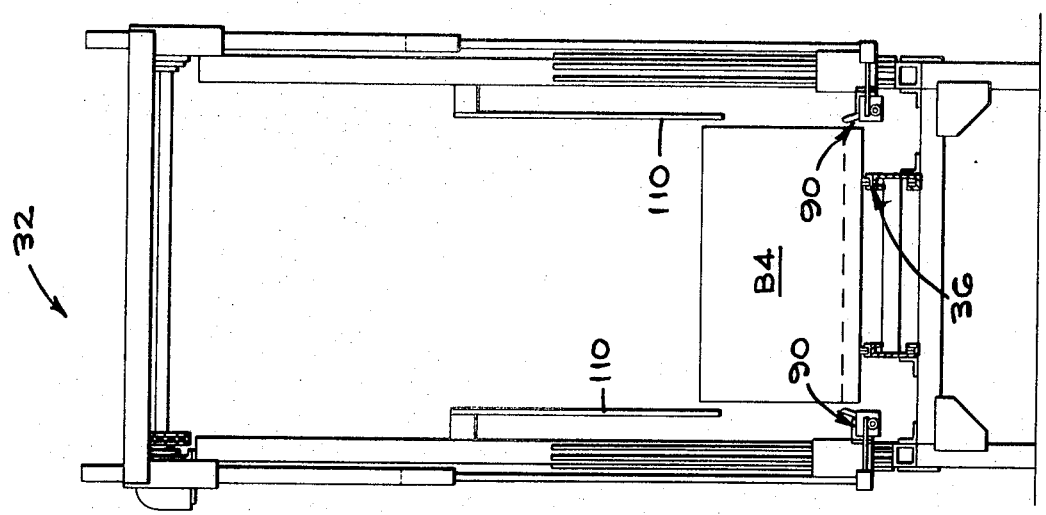

Referring now more particularly to FIG. 1, the apparatus of the present invention is there shown as embodied in an unstacker 32 and a stacker 34. The stacker and unstacker are shown in an operational arrangement wherein they are both arranged to receive bins of fruit to stack and unstack the same respectively. A horizontally oriented conveyor 36 is adapted to carry a stack of bins to the unstacker 32 which is operated to successively lift the top bin or bins and allow the lowermost bin to be delivered forwardly (in the direction of the arrow) to processing apparatus such as the bin dumper 38 which is arranged to accommodate the singulated bins. The dumper, which is a conventional piece of equipment, forms no portion of the apparatus of the present invention, and its structure and operation will therefore not be described herein. The singulated bins are removed from the dumper and are transported forwardly by a second horizontally oriented conveyor 40 which is aligned with the conveyor 36 and which delivers such bins to the stacker 34. The stacker is operated to receive each bin and place it at the bottom of an accumulated stack of bins until such time as the requisite number of bins have been thus stacked. At such time the full stack is discharged forwardly by the conveyor 40 in the direction of the arrow (FIG. 1).

While the stacker 34 and usntacker 32 perform distinctly different operations, each embodies the basic structure of the present invention. As will be pointed out in greater detail hereinafter, one can be converted to the other by merely repositioning the container and lift mechanism sensing devices and by modifying the structure of the lift mechanisms. As can be seen from FIGS. 2 through 5, the container transport conveyors 36 and 40 are conventional conveying means comprised of a pair of endless conveyor chains 41 arranged to run in parallel tracks 41a and to support the bulk bins or containers B on their upper surfaces. The conveyors are separately driven by conventional electric motor drive means 42 (only one of which is shown in FIG. 1) which are electrically controlled through sensing relays so that they may be stopped and started in response to conditions existing in the stacker and unstacker, all as will be explained in greater detail hereinafter.

Referring now more particularly to FIGS. 2 and 3, which show the unstacker 32, and to FIGS. 4 and 5, which show the stacker 34, it will be seen that each structure comprises a pair of upright tubular support posts 50 which are mounted upon a generally rectangular base frame structure 51 that also serves to support the transport conveyors 36 or 40. The posts 50 extend upwardly on both sides of the associated conveyor, and they are connected across the top by a tubular cross frame member 53.

As particularly shown in FIG. 6, the cross frame member 53 at the top of the apparatus is provided with a pair of rigidly attached angle brackets 54 at each end thereof with the brackets being, in turn, rigidly secured to the uppermost ends of the posts 50. The brackets serve to rotatably support a drive shaft 56 which extends parallel to the cross frame member and is spaced outwardly therefrom. The cross frame member also carries a support plate 58 at one end thereof upon which is mounted a reversible drive motor 60 that is in driving engagement with the drive shaft through a drive chain 61 and associated sprockets. Attached to each end of the drive shaft are a pair of pinions 62 which are arranged to engage a pair of vertically extending racks 64. As particularly illustrated in FIGS. 7 and 8, each rack is adapted to ride between the outer face of the associated angle bracket 54 and the inner face of a small plate 66 which is secured in spaced relationship to the angle bracket by means of bolts 67 which extend through cylindrical spacer members 68 at the upper and lower ends of the plate. Located between these spacer members and extending inwardly from the angle bracket 54 and the plate 66 are a pair of stud shafts 70 each of which rotatably support a washer 71 and a roller 72 at the inner end thereof. As shown in FIG. 8, each rack is provided with a wear strip 74 along the rearward face thereof which strip is arranged to engage and be guided by the rotatable washers 71 at the outer edges thereof. The wear strip is also arranged to engage the rollers 72 along the face thereof so that the vertical movement of the rack will be smooth and so that good driving engagement between the pinion and rack will be assured. As shown in FIG. 7, the rollers 72 are offset in the vertical plane to further insure a stable support for the drive connection to the racks.

The wear strips 74 which extend downwardly from the racks 64 (as shown for example in FIGS. 2 or 4) are adapted to be bolted to vertically extending link members 76 the lower ends of which are connected to carriages 78 one of which latter structures is shown in detail in FIG. 13. The carriages, which are adapted to carry the container lifting mechanisms, are arranged to be received upon the tubular posts 50 so that they may jointly move in the vertical plane as the racks are moved in response to rotation of the drive shaft 56. In order to provide for this movement, each post 50 is provided with six guide strips 80 which are positioned in pairs on three sides of the post so as to form vertical guide tracks 82 therebetween. Each carriage comprises a cage-like structure formed of a pair of side plates 84 which are connected at one end by a pair of support blocks 86. The other end of each of the support plates 84 is provided with a laterally extending ear 87 to which a base plate 88 is bolted by means of bolts 89. The lift mechanism 90 for the unstacker or 92 for the stacker (to be described presently) are adapted to be bolted to the outwardly extending face of the base plate 88 by the aforedescribed connecting bolts 89. Attached at the top and bottom of the side plates 84 and centrally of each of the support blocks 86 are shoulder bolts 94 having cam follower rollers 96 rotatably received at the outer ends thereof. As will be apparent from FIG. 13, each of the cam follower rollers are arranged to be received in the tracks 82 so as to roll upon the inner surfaces of the guide strips 80 during vertical movement of the carriage whereby ample support is provided for the carriage so that it may move easily as the supporting rack is driven.

The lift mechanisms 90 and 92 for the unstacker and stacker, respectively, are attached to each of the vertically reciprocable carriages 78 and are shown in detail in FIGS. 9, 10 and 11. Each lift mechanism 90 (FIGS. 10 and 11) will be seen to include an angle support member 100 which is attached, by means of the bolts 89, to the face plate 88 of the associated carriage 78. Support blocks 102 are attached to the inwardly directed face of the angle support member and serve to rotatably support a shaft 104 which extends in a horizontal plane transversely of the associated post 50 and spaced inwardly therefrom. Rigidly attached to the shaft 104 between each of the end pairs of support blocks 102 are a pair of fingers 106. A pair of counterweight members 108 are attached to the outer ends of the shaft 104 so as to normally cause the fingers 106 to be pivoted upwardly (to the position shown in FIG. 11) until they engage the upper edge of the angle support member 100. In this position the fingers will be clear of the path of the containers in the unstacker so that they can move upwardly past the lowermost container in the stack.

Positioned at the center of the shaft 104 and rigidly attached thereto is a projecting finger 109. As the carriages 78 are moved upwardly to a position just above the lowermost container the fingers 109 are adapted to be engaged by a pair of vertically extending cam members 110 (FIG. 3) which are attached in spaced relationship to the mounting posts 50 and extend parallel thereto. Rotation of the finger 109 by the lower end a cam member 110 will cause the fingers 106 to be pivoted downwardly (to the position shown in FIG. 10) until they are received upon stops 103 attached between each pair of support blocks 102.

When the fingers 106 are pivoted by the cam members 110, the lift mechanisms will be in a position whereby the fingers will be projected into a space between the lowermost container B and the container directly thereabove. This operation is shown diagrammatically in FIGS. 14 and 15. Continued upward movement of the carriages (FIG. 16) will result in the lifting of the uppermost containers leaving the lowermost container on the transport conveyor 36. By means to be described presently, the lowermost container can then be removed from the unstacker and the supported containers can be lowered back to the conveyor by the carriages. Continued downward movement of the carriages will free the supporting fingers 106 from the containers and allow the counterweights 108 to bring the fingers back to their normal upwardly pivoted position (FIG. 11) wherein they can again be moved upwardly to repeat the aforedescribed procedure.

The lift mechanism 92 of the stacker is similar to the lift mechanism 90 for the unstacker in that it utilizes pivotally mounted fingers 120. However, the normal position of the stacker container support fingers 120 is as shown in FIG. 9 wherein they are oriented in a horizontal plane. Each finger 120 is pivotally mounted upon the associated lift mechanism by means of laterally extending pintles 122 which are rotatably received in spaced support blocks 124. A pair of support blocks 124 are attached to each end of an angle support bracket 126 so as to pivotably mount a finger 120 at each end thereof. In the aforesaid normal position of the fingers, the outer ends thereof will be engaged by the lower surface of the associated support bracket 126 to maintain them in a horizontal plane while they receive the load of the stacked containers upon the inner ends thereof (FIG. 12). The support bracket 126 is adapted to be bolted to the base plate 88 of one of the carriages 78 by the connecting bolts 89 as in the manner of mounting of the unstacker lift mechanism 90.

When the carriages 78 are located below a container on the transport conveyor 40, the fingers 120 will assume their normal position as shown in FIG. 9. The carriages can then be moved upwardly and the container will be received upon the fingers and lifted thereby. The container can then be elevated to a position wherein a second container can be brought in by the transport conveyor to a position directly below the lifted container. The carriages can then be moved downwardly to place the lifted container on top of the second container. This downward movement will cause the lower face of each of the fingers 120 to engage a top edge of the lowermost container to thereby pivot the fingers upwardly until they are rotated out of the path of the descending containers. Continued downward movement of the carriages allows the fingers to slide downwardly past the containers until the carriages are again positioned below the lowermost container. This process can be repeated until a full stack of containers has been accumulated. The pivoting movement of the fingers 120 during the downward travel of the carriages is shown in the full and phantom line illustrations of FIG. 12.

In both the stacker 34 and the unstacker 32 the lift mechanisms 92 and 90, respectively, are designed to operate with containers which are supported on runners so that a space in which the lift fingers can be received will exist between each pair of containers in the stack. In the event that a different type of container is used the lift mechanisms may have to be redesigned so that the fingers will be capable of moving between the containers.

In order to adapt the stacker 34 and the unstacker 32 for their respective functions, control systems are provided which generally comprise a series of sensing elements for detecting certain critical locations of the containers and the lift mechanisms. These sensing elements control electrical circuitry which, in turn, controls the drive for the transport conveyors 36 and 40 and the carriage drive motor 60. In the unstacker (FIGS. 2 and 3), a photoelectric cell P1 is provided to sense the presence of more than one container B in the unstacking apparatus. The photocell P1 and its associated reflector 130 are mounted in depending fashion from a pair of brackets 132 that are attached to the upright posts 50 and extend outwardly therefrom in the downstream direction (FIG. 2). It will be recognized that the photocell and light source are provided at one side of the conveyor with the reflector positioned at the other side of the conveyor in a position so that the photocell will sense the presence of the next to the lowermost container in the stack when such container breaks the reflected light beam. Also, a second photoelectric cell P2 and its associated reflector 130 are mounted upon a pair of support brackets 134 which are attached to the base frame 51 of the unstacker. The photocell P2 is located downstream of the stack (FIG. 2) and is designed to sense the discharge of a container from the stack. The base frame 51 also mounts an upright post 140 to which there are attached four limit switches LS-1, LS-2, LS-3 and LS-4. The limit switches are arranged to be actuated during the vertical travel of the carriages by means of actuators 142 and 144 which are attached to one of the upwardly extending links 76. As shown in FIG. 2, the actuators extend laterally of the link so as to engage the actuating arms on the limit switches during the vertical travel of the carriages.

In the stacker 34, as shown in FIGS. 4 and 5, a photoelectric cell P3 and its associated reflector 130 are mounted at the base of the apparatus upon support brackets 134 attached to the base frame 51. Photocell P3 is thereby located so as to sense the presence of a container in the stacking zone of the apparatus. A second photoelectric cell P4 and its associated reflector 130 are supported from brackets 146 which are attached to the mounting posts 50 and extend outwardly therefrom in the downstream direction (FIG. 4). The photocell P4 is arranged to sense the uppermost container in a stack of containers when such stack comprises a full load so as to initiate the discharge of the stack. As shown in FIG. 4, the fourth container at the top of the stack would, through photocell P4, indicate that a full stack has been accumulated. Finally, a third photoelectric cell P5 and its associated reflector 130 are positioned across the delivery conveyor 40 at the entrance of the stacker. This photocell serves to permit the delivery of a container to the stacker after the carriages have begun their upward movement but prevents the entry of the container into the stacking zone until the carriages are stopped in their elevated position.

Operation of the stacker 34 and unstacker 32 will be described particularly with relation to the operational views of FIGS. 19 through 24 (for the unstacker) and FIGS. 25 through 30 (for the stacker) taken in conjunction with the electrical circuitry shown in FIG. 17 (unstacker) and FIG. 18 (stacker). In the electrical circuitry shown, each relay has been given the designation "RY" followed by a particular number. The contacts which are actuated by a particular relay are designated with the letter "C" followed by the same number as their associated relay. In the event that there is more than one contact associated with a single relay, the separate contacts are distinguished by the addition of a letter to the numeral designation. For example, the relay RY-1, shown in FIG. 17, has associated therewith the normally open contacts C-1A and C-1B, the normally closed contacts C-1C and C-1D, and the normally open contact C-1E.

Figure 23:
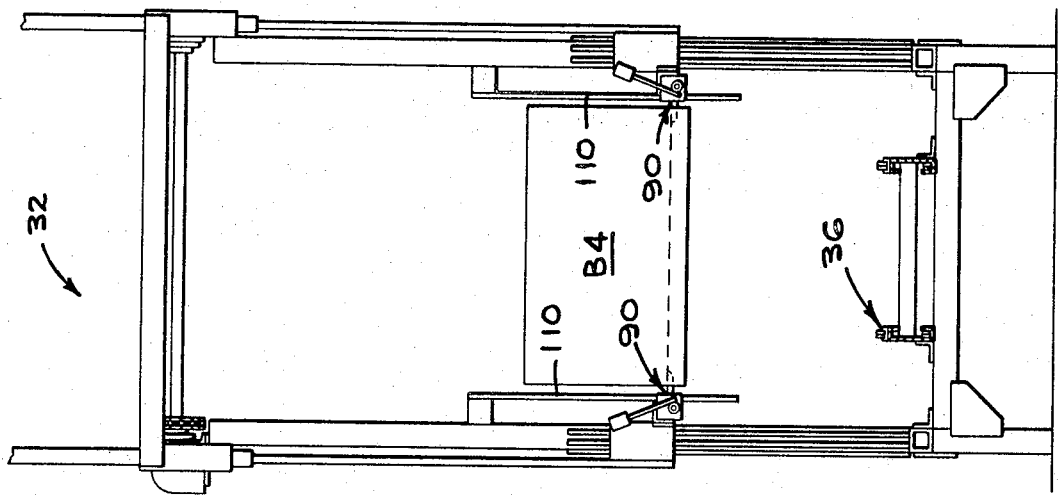
Figure 22:
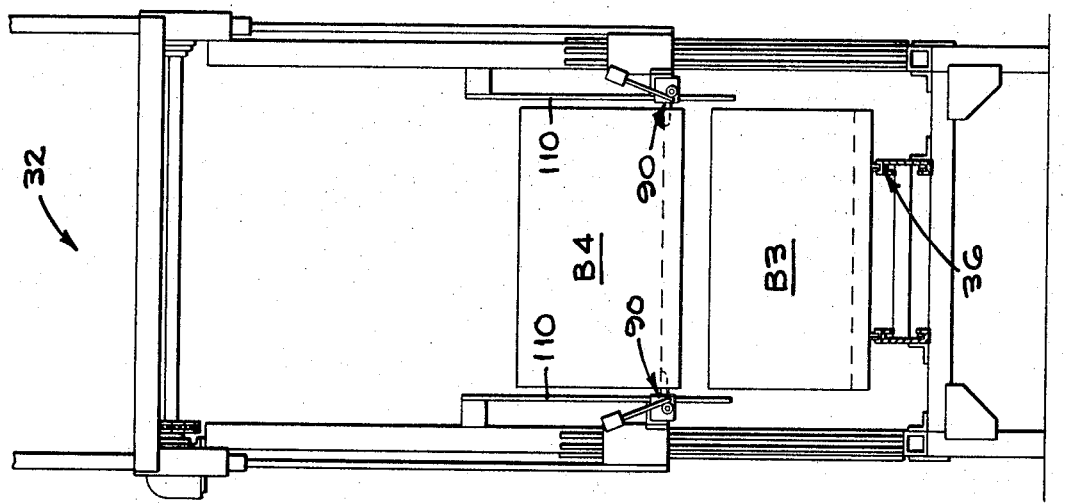

In the operation of the unstacker 32, a stack of bins B1, B2, B3 and B4 (FIG. 19) are delivered by the transport conveyor 36 into the stacking zone between the two upright posts 50. Before the stack enters the stacking zone the lift mechanisms 90 will have moved from their lowermost position, as shown in FIG. 19, to an upper position just below the cam members 110 where the lift fingers 106 are still retained in their outwardly pivoted positions. When a stack of containers is received in the stacking zone its presence will be indicated by the photocell P1. The breaking of the light beam to photocell P1 will deenergize the relay RY-7 to close the normally closed contact C-7 and thereby energize "load in" relay RY-1. The energization of relay RY-1 closes the normally open contact C-1B to complete a circuit to the relay RY-5. The relay RY-5 closes appropriate contacts in the drive motor 60 to cause the drive shaft 56 to rotate in a direction so as to pull the carriages 78 upwardly. Upon initiation of the upward movement of the carriages the cams 110 will cause the support fingers 106 to be pivoted inwardly between the lowermost container B1 and the container B2 thereabove, as shown in FIG. 20. Continued upward movement will occur until the uppermost actuator 142 engages the uppermost limit switch LS-4. This opens the circuit to the relay RY-5 and stops the drive motor 60 and the upward movement of the carriages. The deenergization of the relay RY-5 also closes the normally closed contact C-5C and completes the circuit to the relay RY-6 through contact C-1B, C-1E, and C-2C. The relay RY-6 is provided with appropriate contacts which cause the drive motor for the transport conveyor 36 to be actuated so that the lowermost container B1 is driven out from the stack while the other containers B2, B3 and B4 remain suspended in the elevated position. As the container B1 leaves the unstacker, the beam to photoelectric cell P2 is broken to deenergize relay RY-8. This closes contact C-8 and energizes relay RY-9 which, in turn, closes contact C-9A and opens contact C-9B. The closing of contact C-9A completes a circuit to relay RY-11 which closes holding contacts C-11A and C-11B. When the trailing edge of the container B1 clears the photoelectric cell P2 the relay RY-8 will again be energized to deenergize the relay RY-9 to open contact C-9A and close contact C-9B. The relay RY-11 will remain energized for a brief period of time while the capacitor C1 dumps its charge through the relay and the series resistor R1. During this time the circuit to reset pulse relay RY-10 is complete through closed contact C-11B and a contact C-10B is closed to complete a circuit to the relay RY-3. This, in turn, closes contact C-3B to complete a circuit to the relay RY-4. The relay RY-4 closes appropriate contacts in the circuitry for the drive motor 60 to reverse the motor and cause the carriages 78 to be moved downwardly. Thus, the containers B4, B3 and B2 will be moved downwardly to the underlying conveyor to the position shown in FIG. 21. Before the carriages get to their lowermost position, the limit switch LS-1 will be closed by the actuator 144 to complete a circuit to the relay RY-2 which opens the contact C-2C to break the circuit to the "conveyor forward" relay RY-6 so that no further containers will be moved into the unstacker while the stack is down. When the carriages get to their lowermost position and the lifting fingers are automatically dropped to their outwardly pivoted positions, as shown in FIG. 21, the carriages will automatically be again elevated. The carriages will be lifted and the fingers will be cammed so as to lift the uppermost containers B3 and B4 from the lower container B2 allowing it to be discharged from the apparatus with the aforedescribed process being repeated as shown in FIGS. 22, 23 and 24 until the last container B4 is discharged therefrom. During the last operating cycle, when the carriage is in the down position and the last container B4 is discharged from the apparatus, the carriages will again be elevated even though the "load in" relay RY-1 will be deenergized since a circuit will be completed through the normally closed contact C-2B and the closed limit switch LS-4 to the "carriage up" relay RY-5. However, before the carriages get to the uppermost position, the limit switch LS-4 will be opened to break this circuit and stop the carriages in a position just before the fingers are cammed inwardly. The apparatus will remain in this condition until a new stack is brought into the apparatus to energize the "load in" relay RY-1 and cause the continued upward movement of the carriages to the uppermost position all as described hereinbefore. Special pushbuttons PB1 and PB2 are provided in the event that it is desired to manually lower or elevate the carriages.

Figure 30:
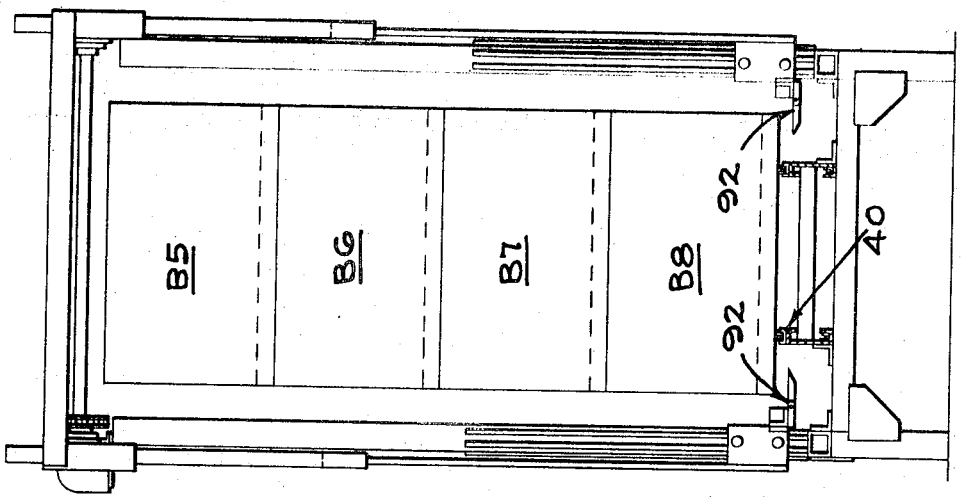
Figure 31:
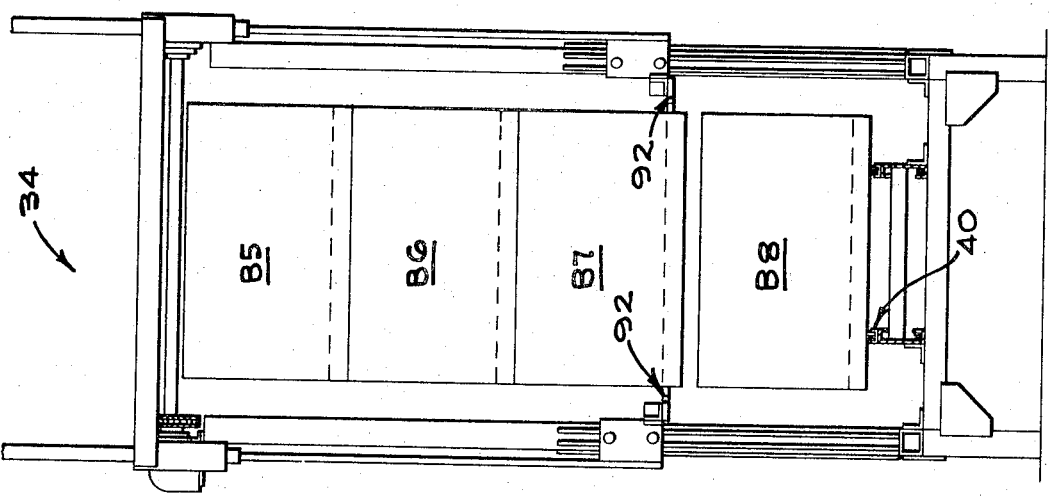
Figure 29:
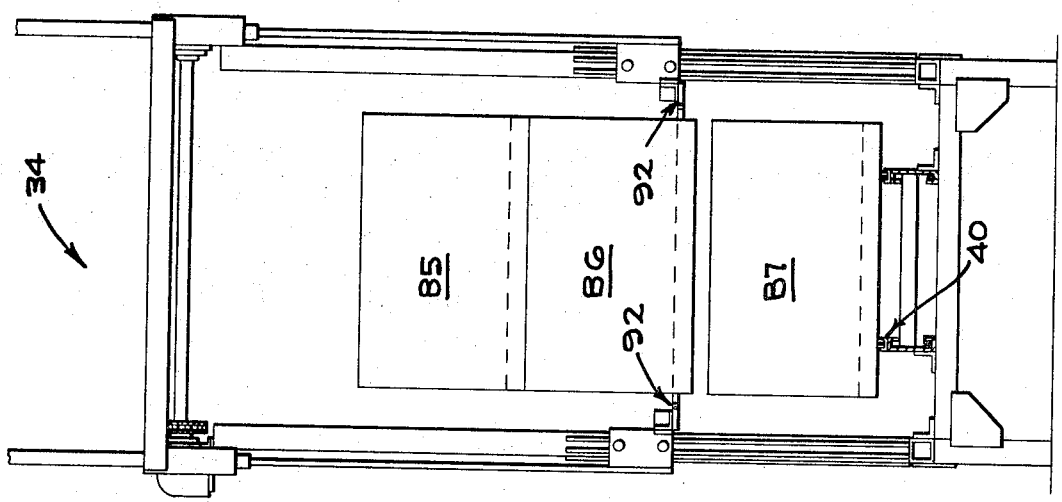

The operation of the stacker 34 is shown diagrammatically in FIGS. 25–30 with the electrical circuitry therefor being schematically shown in FIG. 18. Initially the conveyor 40 is operated through energization of relay RY-18 so as to bring a container B5 into the stacking zone (FIG. 25), it being understood that "conveyor forward" relay RY-18 closes contacts in the conveyor drive motor to cause the conveyor to be activated. Once the container is received within the apparatus the beam to the photoelectric cell P3 will be broken to deenergize relay RY-19 and close the contact C-19. With the carriages 78 in their lowermost position, section LS-6A of limit switch LS-6 will be closed by the lowermost actuator 144 so that the closing of contact C-19 completes a circuit to the relay RY-14 through normally closed contacts C-17A and C-15 and the normally closed limit switch section LS-7A. The relay RY-14, through appropriate contacts, activates the drive motor 60 so that the carriages are elevated to pick up the container B5. Energization of relay RY-14 also energizes holding relay RY-13 to close contact C-13A and maintain the circuit to the "up" relay RY-14 even after the limit switch section LS-6A is opened. As the carriages move upwardly the actuator 142 will close limit switch LS-5 to complete a circuit to the relay RY-12 closing contact C-12B. This provides a circuit to the "conveyor forward" relay RY-18 to permit the conveyor to bring a second container B6 into the apparatus while the lowermost container B5 is elevared to the uppermost position (FIG. 26). When the carriages reach the uppermost position wherein the top actuator 142 opens the section LS-7A of the top limit switch LS-7, the circuits to the relays RY-12, RY-13 and RY-14 are broken to stop the upward movement of the carriages. A circuit to the relay RY-15 will subsequently be completed when the contact C-19 is closed. This contact will be closed by the deactivation of photocell P3 by the container B6 when it reaches the stacking position and the resultant deenergization of relay RY-19. When this occurs the downward movement of the carriages is initiated since the "down" relay RY-15 closes appropriate contacts which reverse the drive motor 60 and, therefore, reverse the direction of movement of the carriages. Also, the "conveyor forward" relay RY-18 is deenergized by the opening of contact C-16B. Relay RY-15 is maintained in an energized condition during downward movement of the carriages by a holding relay RY-16 similar to the holding relay RY-13. As the carriages move downwardly the top container B5 will be deposited atop the lower container B6, as shown in FIG. 27. When the carriages arrive at their lowermost position the process will again be repeated to pick up the containers B5 and B6 to allow a third container B7 to enter the apparatus as shown in FIG. 28. The process is again repeated to allow a fourth container B8 to enter the apparatus as the containers B5, B6 and B7 are elevated by the carriages. However, with the elevating of the top three containers to allow the stacker to receive the container B8 (FIG. 29), the uppermost container B5 will break the beam to the photoelectric cell P4 to deenergize relay RY-20. This closes contact C-20 so that when the carriages get to the uppermost position and the limit switch section LS-7A is closed, the "full load" relay RY-17 will be energized. Energization of relay RY-17 opens contact C-17A to prevent the carriages from moving upwardly again by opening the circuit to the relay RY-14. However, the carriages are moved downwardly by energization of relay RY-15, and the top three containers will be deposited upon the lowermost container B8 as shown in FIG. 30. When the carriages arrive at their lowermost positions the limit switch section LS-6C is opened and the relays RY-15 and RY-16 are deenergized. This closes the contact C-16B and completes a circuit to the relay RY-18 to drive the conveyor 40 forwardly to permit the full stack to be discharged from the apparatus. The photoelectric cell P5 is provided across the entrance to the stacking apparatus so that if a container breaks the beam to thereby deenergize relay RY-21 the contact C-21 will be opened to break the circuit to the "conveyor drive" relay RY-18 during upward movement of the carriages so that the container entering the stacking apparatus will not collide with the containers being elevated. If it is desired to manually elevate or lower the carriages, pushbuttons PB3 and PB4 are provided for this purpose.

By the foregoing description it will be appreciated that a stacker or unstacker apparatus is provided which is of lightweight construction but which will function efficiently and require little or no maintenance. Even though the structure of the present invention is lightweight and non-complex, it is rugged and durable and capable of handling heavy loads such as the bulk fruit bins normally stacked and unstacked in commercial fruit packing operations.

Although the best mode contemplated for carrying out the present invention has been herein shown and described, it will be apparent that modification and variation may be made without departing from what is regarded to be the subject matter of the invention.

What is claimed is:

1. Apparatus for stacking or unstacking containers comprising conveying means arranged in a generally horizontal plane, a pair of vertical posts one being mounted adjacent each opposed side of said conveying means, control means for bringing said containers to a position adjacent to said posts, a carriage mounted for vertical movement on each post of said pair of posts, each of said carriages including pivotably mounted lift fingers movable between a first position wherein they project toward said conveying means to receive and support a lower surface of one of said containers and a second position wherein they are out of the path of the containers, a vertically extending rack connected to each of said carriages, each rack extending parallel to and being supported by its associated post for vertical movement relative thereto, each carriage including a mounting frame structure which encompasses the associated post upon which it is mounted whereby all forces other than vertical forces which are imposed on said carriages will be transferred to said posts rather than to said racks, said posts and racks comprising the sole support means for said carriages, a shaft having a pair of pinions thereon arranged to engage said racks, and drive means arranged to rotate said shaft so as to jointly move said carriages and said one container vertically while said container is supported on said lift fingers.

2. Apparatus according to claim 1 including vertically extending guide tracks provided on each of said posts, each of said carriages being provided with inwardly projecting guide means arranged to be received in said tracks.

3. Apparatus according to claim 2 wherein said guide means comprise rollers mounted for free rotary movement.

4. Apparatus according to claim 1 wherein each of said racks extend upwardly adjacent to one of said posts and wherein said shaft is located in a generally horizontal plane at the top of said apparatus.

5. Apparatus according to claim 4 including roller guide means for supporting the upper end of each of said racks.

6. Apparatus according to claim 1 wherein said lift fingers are pivotally mounted upon said carriages for movement between a first position wherein said fingers extend inwardly in a generally horizontal orientation to engage and support said containers and a second position wherein said fingers are pivoted upwardly so that they are out of the vertical path of travel of said containers in said apparatus.

7. Apparatus according to claim 6 wherein said first position of said fingers is the normal position thereof when said fingers are not in engagement with one of said containers, said fingers being arranged to be pivoted to said second position by engagement with one of said containers upon downward movement of the associated carriages, and control means for operating said drive means so that said apparatus is programmed to stack successive containers delivered thereto by said conveying means.

8. Apparatus according to claim 7 wherein said control means for operating said drive means includes means for sensing the presence of a container on said conveying means between said posts and means for sensing the presence of a container near the upper ends of said posts.

9. Apparatus according to claim 6 wherein said second position of said fingers is the normal position thereof when said fingers are not in engagement with one of said containers, stationary cam means for pivoting said fingers to said first position upon upward movement of the associated carriages, and control means for operating said drive means so that the apparatus is programmed to successively elevate all but the lowermost container in a stack of containers to permit said lowermost container to be moved from said stack by said conveying means until each of the containers in said stack has been individually moved from said apparatus.

10. Apparatus according to claim 9 wherein said control means for operating said drive means includes means for sensing the presence of a container atop the lowermost container in said stack and means for sensing the discharge of the lowermost container from said apparatus.

* * * * *

UNITED STATES PATENT OFFICE
CERTIFICATE OF CORRECTION

PATENT NO. : 3,765,546
DATED : October 16, 1973
INVENTOR(S) : DAVID E. WESTERLING It is certified that error appears in the above-identified patent and that said Letters Patent are hereby corrected as shown below:

On 1st page of the Letters Patent the Assignee was left out. Should be --Assignee: FMC Corporation, San Jose, Calif.--.

Column 1, line 24, "stacking" should be --packing--.

Column 1, line 38, "posite" should be --posed--.

Column 9, line 7, "LS-4" should be --LS-3--.

Column 10, line 36, "vared" should be --vated--.

Signed and sealed this 1st day of July 1975.

(SEAL)
Attest:

RUTH C. MASON
Attesting Officer

C. MARSHALL DANN
Commissioner of Patents
and Trademarks